(No Model.)
R. P. SCOTT.
PNEUMATIC TIRE.
No. 542,811.
Patented July 16, 1895.
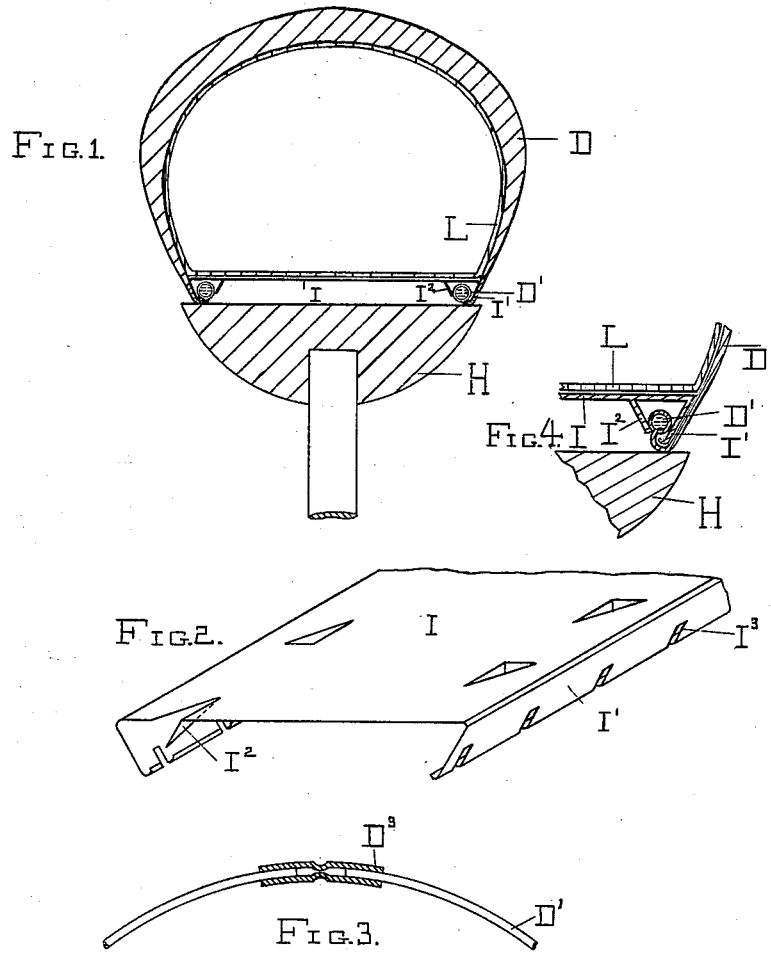
WITNESSES:
Chas Bert
J. P. Gander
INVENTOR
Robert P. Scott

UNITED STATES PATENT OFFICE.

ROBERT P. SCOTT, OF CADIZ, OHIO.

PNEUMATIC TIRE.

SPECIFICATION forming part of Letters Patent No. 542,811, dated July 16, 1895.

Application filed January 7, 1895. Serial No. 534,026. (No model.)

*To all whom it may concern:*

Be it known that I, ROBERT P. SCOTT, a citizen of the United States, residing at Cadiz, Harrison county, Ohio, have invented a new and useful Improvement in Pneumatic Tires, of which the following is a specification.

My invention relates to a detachable tire in which a circular endless auxiliary plate is employed, which is held in place by air-pressure alone, requiring no devices to draw up the ends of the band and which in turn automatically fastens the parts of the tire to the wheel-rim, and consists in a certain novel shape of this plate, whereby the lateral pull of the tire selvage is made to cause a pressure of the parts against the wheel-rim, and whereby I am enabled to completely assemble the plate and parts of the tire when off the wheel-rim to enable them to be more readily slid thereon, a groove being provided on the under side of the plate, which is large enough to hold the selvage of the tire in place by spring pressure.

In the drawings, Figure 1 shows a section of the tire, inflated, in place on the rim; and Fig. 2, a perspective of a piece of the plate; Fig. 3, an elevation of the ends of the selvage-wire, and Fig. 4 an enlarged section of a portion of the parts.

The outer shoe D, having an extensible selvage D' of wire, bamboo, hickory, cord or the like, and the inner tube L are of usual construction, except that I make the outer shoe of canvas, soaked in oil and red lead. The wheel-rim H is made of wood or metal and has a preferably flat top. The plate I is composed of a continuous annular band of steel or similar material, having flanges I' at the sides at a re-entrant angle with the top surface of the band and being broad enough to provide a groove for the selvage D'. Tongues I² are stamped out of the plate and bent down to hold the selvage in the groove formed between the plate I and flange I'. The selvages D' shown in Fig. 3 are circles of wire which are held against compression by the tube D³, but which are yet extensible. In case the selvage is of a stiff material the tongues may be dispensed with.

To assemble the parts, I place one of the selvages D' in the grooves between the tongues I² and flanges I', the extensible nature of the wire or cord selvage permitting this to be readily done and the large size of the groove and the spring-action of the parts holding the selvage in place. The inner tube L is then inserted between the plate I and shoe D and then the other selvage D' is put in place between the flange and tongues on the other side of the plate. The plate, shoe, and inner tube being thus assembled, the whole can readily be slid on to the wheel-rim and inflated in the usual way. Upon inflation of the inner tube the strain upon the selvage through the shoe is such as to pull the selvage laterally outward. The angle of the flange I' with the plate I, however, being re-entrant, this pull tends to make the flange I' stand more nearly normal or perpendicular to the wheel-rim, thus decreasing the diameter of the edge of the flange which rests against the wheel-rim. This decrease in the diameter of the flange causes a grip of the parts against the wheel-rim and holds it in place. This is an important feature of my invention.

Instead of the separate tongues I² stamped out of the plate, a continuous strip might be used. The separate tongues, however, are more convenient in assembling the parts. It will also be noticed that I slit the flanges I' at a number of points, whereby each flange can more readily shrink and conform to the rim. Without these slits the lateral pull on the flange would not be sufficient to compress the continuous flange an amount necessary for the purpose. As to the radially-inward pressure against the plate I, caused by the inner tube, it may be said that the resistance to compression of any plate which can be used is so great that no perceptible shrinking thereof is caused by this radial pressure, which does not, therefore, have any appreciable effect in holding the plate against the rim.

What I claim is—

1. The combination of a wheel rim, an annular plate, a flange making a re-entrant angle with the plate and forming a groove thereunder and an inflatable tire having a selvage seated within the groove, the arrangement being such that inflation of the tire causes the flange to stand more nearly normal to the rim and thus assists in securing the parts in place.

2. The combination of a wheel rim, an annular plate and a flange making a re-entrant angle with the plate and forming a groove therewith, the flange being provided with slits substantially as described.

ROBERT P. SCOTT.

Witnesses:
CHAS. BERT,
J. T. GANDER.